W. S. GRAHAM.
FRAME FOR AGRICULTURAL IMPLEMENTS AND THE LIKE.
APPLICATION FILED JAN. 17, 1916.
1,265,322.
Patented May 7, 1918.
2 SHEETS—SHEET 1.
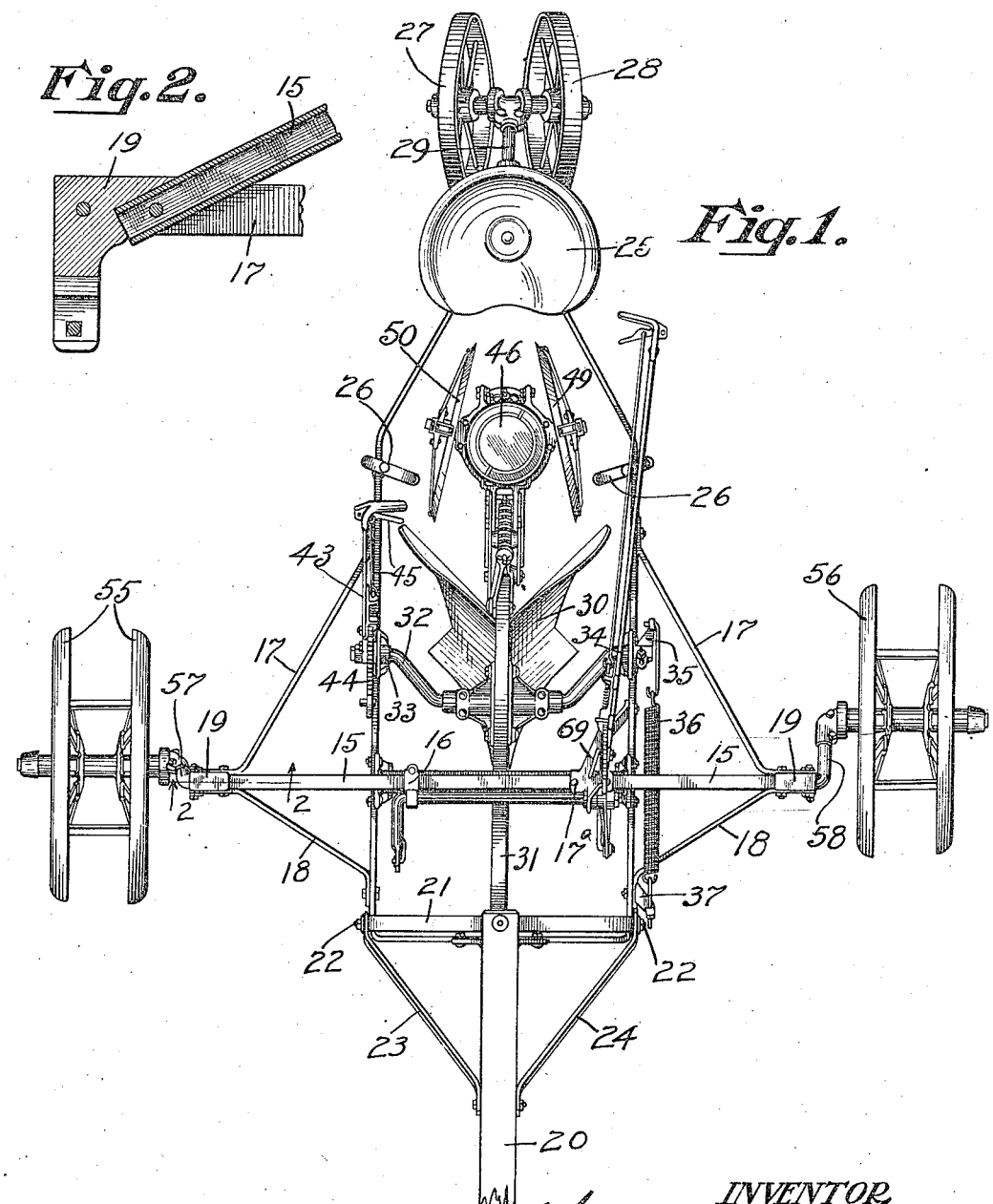
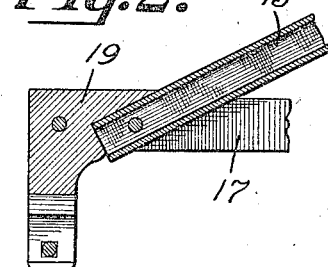
INVENTOR.
William S. Graham
By Adams & Jackson
Attorneys.

W. S. GRAHAM.
FRAME FOR AGRICULTURAL IMPLEMENTS AND THE LIKE.
APPLICATION FILED JAN. 17, 1916.

1,265,322.

Patented May 7, 1918.
2 SHEETS—SHEET 2.

INVENTOR
William S. Graham.
By Adams & Jackson
Attorneys.

UNITED STATES PATENT OFFICE.

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

FRAME FOR AGRICULTURAL IMPLEMENTS AND THE LIKE.

1,265,322.

Specification of Letters Patent.

Patented May 7, 1918.

Original application filed May 29, 1915, Serial No. 31,156. Divided and this application filed January 17, 1916. Serial No. 72,476.

*To all whom it may concern:*

Be it known that I, WILLIAM S. GRAHAM, a citizen of the United States, and a resident of Canton, in the county of Fulton, State of Illinois, have invented certain new and useful Improvements in Frames for Agricultural Implements and the like, of which the following is a specification, reference being had to the accompanying drawings.

My invention relates to a new and improved construction of frame for agricultural implements and the like, being especially designed for use with a lister plow of the type shown in Letters Patent of the United States Number 1,249,067, dated Dec. 4, 1917, granted to me on application Serial No. 31,156 filed May 29, 1915 of which the present application is a division. It is the object of my invention to provide a form and arrangement of frame parts such as to be capable of withstanding the heavy stresses to be brought to bear in use upon the framework, especially in an implement or other machine employing a two-part axle construction the parts of which are movable independently of each other. The preferred means by which I have accomplished my objects are illustrated in the drawings and are hereinafter specifically described. That which I believe to be new and desire to cover by this application is set forth in the claims.

In the drawings:—

Figure 1 is a top or plan view of a lister plow embodying my improved construction;

Fig. 2 is an enlarged detail, being substantially a vertical cross-section taken on line 2—2 of Fig. 1.

Referring to the several figures of the drawings, in which corresponding parts are indicated by the same reference characters,—

Figure 3:
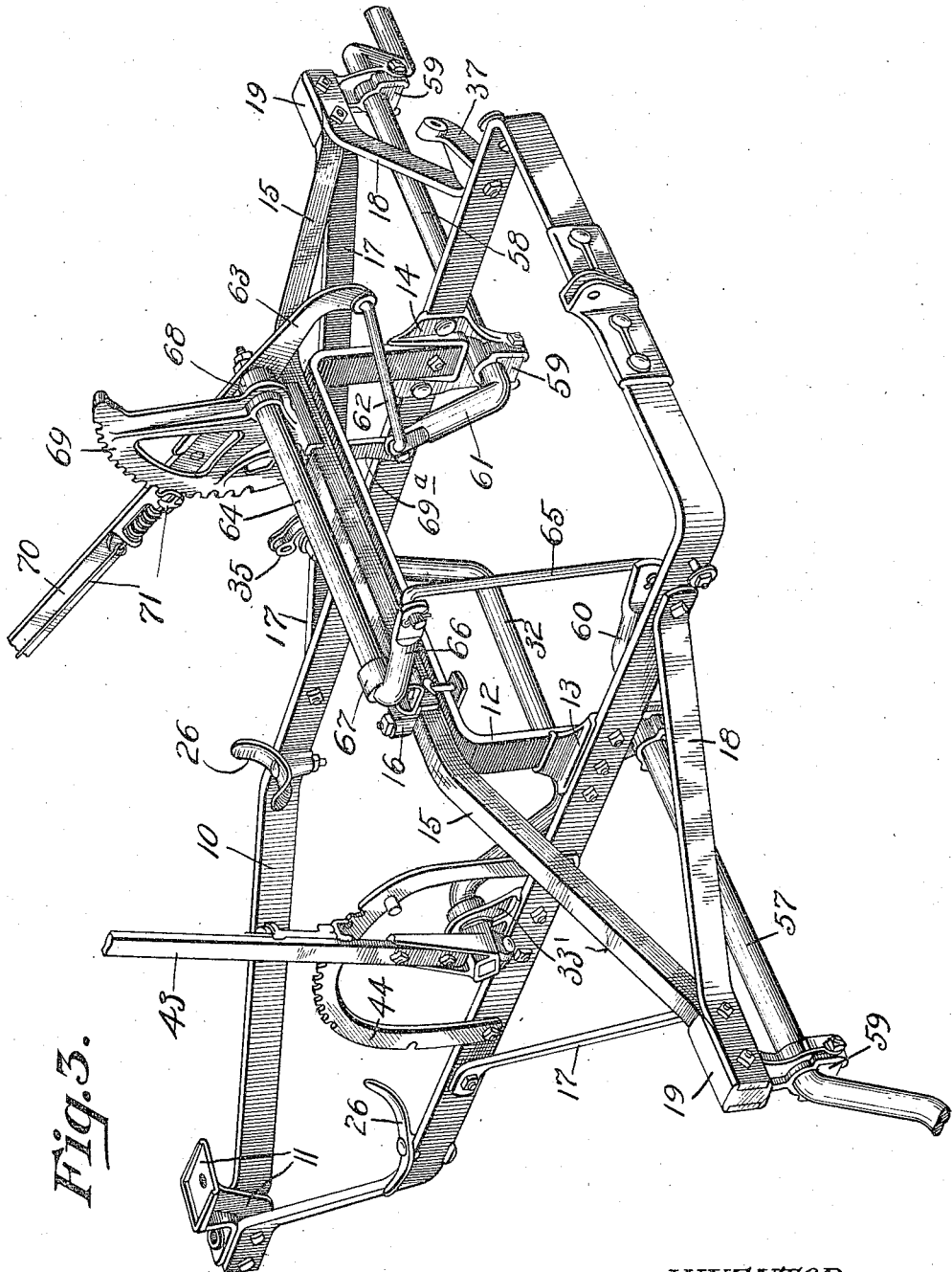
Fig. 3 is a perspective view of my improved frame.

10 indicates a frame member comprising side bars converging toward their rear ends which are joined together on opposite sides of a bracket 11. An arch 12 has its lower ends connected to the side bars of the frame member 10 by means of brackets 13—14. A second arch 15, preferably in the form of a hollow pipe as shown in Fig. 2, is secured in position upon the arch 12 by means of a suitable clip 16 embracing the said two arches and a bolt 17ª passing through the said arches. The outer end of the arch member 15 at each side of the machine is connected by means of diagonally-disposed brace-bars 17—18 with the adjacent side bar of the frame 10. A bearing bracket 19 is secured between the outer ends of the brace-bars 17—18 at each side of the machine, each of said bearing brackets being shaped to fit snugly about the end of the arch and between the two brace-bars. By this arrangement of frame-parts, the frame as a whole is rendered exceedingly strong and rigid capable of resisting the various stressing forces brought to bear upon it.

A tongue 20 is pivotally mounted upon the frame 10 by means of a transversely-extending bar 21 which is connected by means of bolts 22 to the said frame member 10, diagonally-disposed brace-bars 23—24 being employed for holding the tongue rigid laterally relative to the framework. A seat 25 of any suitable type is mounted upon the bracket 11. Foot-rests 26 are mounted upon the frame member 10 in convenient position relative to the seat 25. Caster wheel mechanism comprising wheels 27—28 inclined at a slight angle relative to each other are mounted by means of an axle member 29 in the bracket 11, the inclination of the axes of the wheels being such as to cause the wheels to converge toward their lowermost parts.

A double mold-board lister plow-body 30 is carried by the framework through the medium of a plow beam 31 of the ordinary type which is journaled upon the off-set portion of a crank axle 32, the ends of which are journaled upon the frame member 10 by means of bearing brackets 33—34. An arm 35 is mounted upon the squared outer end of the crank axle 32 at one side of the machine, being connected by means of a coiled spring 36 with an arm 37 mounted upon the frame member 10 near its forward end. The spring 36 tends to cause rotation of the crank axle 32 in the direction for raising the plow-body 30. Upon the squared end of the crank axle 32 opposite to that upon which the arm 35 is mounted, there is fixedly mounted a lever 43 by which the said crank axle is adapted to be turned in its bearings 33—34. The lever 43 is adapted to be adjusted to any desired position relative to a segmental rack 44 mounted upon the frame member 10, the lever being adjustably held in position by means of spring latch mechanism 45 of any suitable type. By a manipulation of the lever 43 and the consequent turning of the crank axle member 32 the plow-body 30 will be raised or lowered out of or into operative ground-engaging position, as is desired, the spring 35 serving to assist in the plow-raising operation.

Mounted upon the plow-beam 31 in rear of the plow-body 30 there is suitable seeding mechanism comprising a hopper 46 provided with seed dropping devices of any approved type, by which seeds are adapted to be dropped successively as desired into the furrow opened by the plow-body 30. The seed dropping devices are preferably operated through the medium of covering devices 49—50 which are revolubly mounted relative to the hopper 46. One or both of the disks 49—50 is connected by any suitable train of mechanism with the seed dropping devices whereby upon the rotation of the disks 49—50 by their engagement with the ground the seed dropping mechanism is operated.

The machine as a whole is supported by wheels 55—56 which are journaled upon the horizontal portions of crank axles 57—58, respectively. The said axle members 57—58 are journaled in the brackets 19 and the brackets 13—14. Each of these brackets is provided with a bearing block 59 (see Fig. 3) which coöperates with the bracket for revolubly supporting the axle members. The axle members 57—58 are provided at their inner ends with arms or levers 60—61, respectively. The arm or lever 61 of the axle member 58 is pivotally connected by means of a link 62 with an arm or lever 63 which is rigidly mounted upon a rock-shaft 64 which is journaled adjacent to the central portion of the arch 15. The arm or lever 60 of the axle member 57 is pivotally connected by means of a link 65 to an arm or lever 66 also rigidly connected with the rock-shaft 64, in the construction shown the arm or lever 66 being formed integrally with the rock-shaft 64. The rock-shaft 64 is journaled upon the framework by means of a sleeve 67 forming a part of the clip 16, and a sleeve 68 forming a part of a segmental rack member 69 which is secured by means of the bolt 17ª upon the arch member 15. An arm 69ª also connects the rack member 69 with the frame member 10 for bracing the rack member securely in position. A lever 70 is rigidly connected to the upper or rear end of the arm 63, being adapted to be secured by means of spring-latch mechanism 71 at any desired point along the segmental rack 69.

By the provision of a double arch structure and the diagonally-extending brace-bars by which the longer arch is braced relative to the frame member 10, I have provided a very strong neat frame suitable for use with a two-part axle the parts of which are movable independently of each other. Very heavy stresses are brought to bear upon this frame upon the alternate raising and lowering of the supporting wheels relative to each other, but I have found in practice that the frame is capable of withstanding the stresses and of maintaining its normal shape under trying conditions of use.

What I claim as my invention and desire to secure by Letters Patent, is—

1. The combination of a frame member, a transverse arch connecting the side portions of said frame member, a second arch connected to said first-named arch and extending at the sides beyond said first-named arch, and diagonally-extending brace-bars connecting each end of said second arch with said first-named frame member.

2. The combination of a frame member, a transverse arch connecting the side portions of said frame member, a second arch connected to said first-named arch and extending at the sides beyond said first-named arch and beyond said frame member, axle members journaled on said second arch and on said first-named frame member at opposite sides of the machine, and braces connecting the ends of said second arch with said first-named frame member.

3. The combination of a frame member, an inverted U-shaped frame member having its ends secured to the sides of said first-named frame member, a third frame member extending transversely secured to said second-named frame member and having its outer end portions extending diagonally downward beyond said second-named frame member, and diagonally-extending brace bars connecting the ends of said third frame member with the side portions of said first-named frame member both in front and in rear of said third member.

4. In an agricultural implement, the combination of a frame member, an arch extending across a short distance above said frame member and having its end portions extending diagonally downward and outward into position opposite the sides of said frame member, means for supporting said arch firmly in position above said frame member, and other means serving to tie together the end portions of said arch to prevent their spreading laterally relative to each other whereby a truss bracing effect is secured.

5. In an agricultural implement, the combination of a frame member, an arch extending across a short distance above said frame member and having its end portions extending diagonally downward and outward into position opposite the sides of said frame member, means for supporting said arch firmly in position above said frame member, and diagonally-extending brace-bars connecting the end portions of said arch with said frame to prevent said end portions from spreading laterally relative to each other whereby a truss bracing effect is secured.

6. In an agricultural implement, the combination of a frame member having oppositely-disposed sides, an arch extending across a short distance above said first-named frame member and having its depending end portions fixedly connected to the sides of said frame member, a second arch superposed upon said first-named arch and having its end portions extending diagonally downward and outward beyond said first-named arch, and means serving independently of said second arch to tie together the outer end portions of said second arch whereby a truss bracing effect is secured.

WILLIAM S. GRAHAM.